US010419466B2

(12) United States Patent
Ferguson et al.

(10) Patent No.: US 10,419,466 B2
(45) Date of Patent: Sep. 17, 2019

(54) CYBER SECURITY USING A MODEL OF NORMAL BEHAVIOR FOR A GROUP OF ENTITIES (71) Applicant: DARKTRACE LIMITED, Cambridge (GB)

(72) Inventors: Matt Ferguson, Cambridge (GB); Maha Kadirkamanathan, Cambridge (GB)

(73) Assignee: Darktrace Limited, Cambridge (GB)

( * ) Notice: Subject to any disclaimer, the term of this patent is extended or adjusted under 35 U.S.C. 154(b) by 222 days.

(21) Appl. No.: 15/425,903

(22) Filed: Feb. 6, 2017

(65) Prior Publication Data
US 2017/0230391 A1 Aug. 10, 2017

(30) Foreign Application Priority Data

Feb. 9, 2016 (GB) .................... 1602306.1

(51) Int. Cl.
H04L 12/26 (2006.01)
G06N 7/00 (2006.01)
(Continued)

(52) U.S. Cl.
CPC .......... H04L 63/1425 (2013.01); G06F 21/55 (2013.01); G06N 5/022 (2013.01);
(Continued)

(58) Field of Classification Search
CPC ........ G06F 21/55; G06N 5/022; G06N 7/005; H04L 63/104; H04L 63/1425; H04L 63/20
See application file for complete search history.

(56) References Cited

U.S. PATENT DOCUMENTS 8,312,540 B1* 11/2012 Kahn .................... G06F 21/552
713/183
8,966,036 B1* 2/2015 Asgekar ................. G06Q 50/01
707/706
(Continued)

FOREIGN PATENT DOCUMENTS

EP 2922268 A1 9/2015
WO WO 2001/31420 A2 5/2001
(Continued)

OTHER PUBLICATIONS

Sebyala, Abdallah Abbey, et al. "Active platform security through intrusion detection using naive bayesian network for anomaly detection." London Communications Symposium. 2002. (Year: 2002).*

(Continued)

Primary Examiner — Michael Simitoski
(74) Attorney, Agent, or Firm — Rutan & Tucker, LLP (57) ABSTRACT Disclosed herein is a method for use in detection of abnormal behavior of a group of a plurality of entities of a computer system. The method is arranged to be performed by a processing system and comprises: creating a model of normal behavior of the group of entities; and determining, in accordance with the model of normal behavior of the group of entities, a parameter indicative of abnormal behavior of the group of entities. Also disclosed is an equivalent computer readable medium and anomalous behavior detection system.

16 Claims, 3 Drawing Sheets (51) Int. Cl.
*G06F 11/30* (2006.01)
*H04L 29/06* (2006.01)
*G06F 21/55* (2013.01)
*G06N 5/02* (2006.01)
*H04W 12/08* (2009.01)

(52) U.S. Cl.
CPC ............. *G06N 7/005* (2013.01); *H04L 63/20* (2013.01); *H04L 63/104* (2013.01)

(56) References Cited

U.S. PATENT DOCUMENTS

| | | | |
|---|---|---|---|
| 9,043,905 B1 | 5/2015 | Allen et al. | |
| 9,106,687 B1* | 8/2015 | Sawhney | H04L 63/1416 |
| 9,185,095 B1* | 11/2015 | Moritz | H04L 63/102 |
| 9,516,039 B1* | 12/2016 | Yen | H04L 63/14 |
| 9,516,053 B1* | 12/2016 | Muddu | H04L 63/1425 |
| 9,641,544 B1* | 5/2017 | Treat | H04L 63/1425 |
| 9,727,723 B1* | 8/2017 | Kondaveeti | G06F 21/50 |
| 2003/0070003 A1 | 4/2003 | Chong et al. | |
| 2007/0118909 A1* | 5/2007 | Hertzog | G06F 21/552 726/23 |
| 2008/0005137 A1* | 1/2008 | Surendran | G06K 9/6226 |
| 2010/0095374 A1 | 4/2010 | Gillum et al. | |
| 2010/0299292 A1 | 11/2010 | Collazo | |
| 2011/0093428 A1* | 4/2011 | Wisse | G06N 7/005 706/52 |
| 2011/0213742 A1* | 9/2011 | Lemmond | G06F 17/30684 706/13 |
| 2012/0210388 A1 | 8/2012 | Kolishchak | |
| 2014/0215618 A1 | 7/2014 | Amit | |
| 2014/0325643 A1* | 10/2014 | Bart | H04L 63/1425 726/22 |
| 2015/0067835 A1 | 3/2015 | Chari et al. | |
| 2015/0163121 A1* | 6/2015 | Mahaffey | G06F 11/0766 707/687 |
| 2015/0172300 A1* | 6/2015 | Cochenour | H04L 63/145 726/23 |
| 2015/0180893 A1 | 6/2015 | Im et al. | |
| 2015/0213358 A1* | 7/2015 | Shelton | H04L 41/0604 706/47 |
| 2015/0319185 A1* | 11/2015 | Kirti | H04L 63/1416 726/23 |
| 2015/0341379 A1* | 11/2015 | Lefebvre | H04L 63/1425 726/22 |
| 2015/0363699 A1* | 12/2015 | Nikovski | G06N 99/005 706/58 |
| 2016/0149941 A1* | 5/2016 | Thakur | H04L 63/1425 726/23 |
| 2016/0164902 A1* | 6/2016 | Moore | H04L 63/1433 726/25 |
| 2016/0173509 A1* | 6/2016 | Ray | H04L 63/1425 726/23 |
| 2016/0352768 A1* | 12/2016 | Lefebvre | H04L 63/1425 |
| 2017/0063907 A1* | 3/2017 | Muddu | H04L 63/1425 |
| 2017/0063910 A1* | 3/2017 | Muddu | H04L 63/1425 |
| 2017/0063911 A1* | 3/2017 | Muddu | H04L 63/1425 |
| 2017/0270422 A1* | 9/2017 | Sorakado | G06Q 30/02 |
| 2018/0167402 A1* | 6/2018 | Scheidler et al. | H04L 63/1416 |

FOREIGN PATENT DOCUMENTS

| | | | |
|---|---|---|---|
| WO | WO 2014/088912 A1 | 6/2014 | |
| WO | WO-2015027828 A1 * | 3/2015 | G06Q 50/01 |

OTHER PUBLICATIONS

Von Luxburg, Ulrike. "A tutorial on spectral clustering." Statistics and computing 17.4 (2007): 395-416. (Year: 2007).*

Xu, Kuai, Feng Wang, and Lin Gu. "Network-aware behavior clustering of Internet end hosts." INFOCOM, 2011 Proceedings IEEE. IEEE, 2011. (Year: 2011).*

Zachara, Marek, and Dariusz Palka. "Detecting Unusual User Behaviour to Identify Hijacked Internet Auctions Accounts." International Conference on Availability, Reliability, and Security. Springer, Berlin, Heidelberg, 2012. (Year: 2012).*

Search Report under Section 17(5) issued by the Intellectual Property Office dated Jul. 11, 2016 for Application No. GB1602306.1, 4 pages.

Extended European Search Report dated May 4, 2017 issued for Application No. EP17155222.7 (10 pages).

Non-Final Office Action for U.S. Appl. No. 15/429,062 dated Sep. 7, 2018, 16 pages.

European Patent Office, Examination Report 94(3), dated Nov. 5, 2017, 9 pages, Germany.

* cited by examiner

CYBER SECURITY USING A MODEL OF NORMAL BEHAVIOR FOR A GROUP OF ENTITIES

PRIORITY

This application claims the benefit of Great Britain Application No. GB 1602306.1, filed Feb. 9, 2016, the entire contents of which are hereby incorporated by reference for all purposes.

FIELD

A method for use in detection of anomalous behavior of a computer system is disclosed. More specifically, but not exclusively, a method comprising grouping entities of the computer system and detecting anomalous behavior of the groups is disclosed.

BACKGROUND

The internet has transformed the way we live our lives and the way business operates. It has transformed the communications of government and official organizations to the extent where its criticality is not in doubt. We have an open and global interconnected economy, and the trend is irreversible. The reliance on digital infrastructure to deliver our core business processes has presented significant risk, making vulnerable our most precious commodity: our data, intellectual property, reputation and increasingly our connected critical national infrastructure.

The past few years have seen an exponential rise in the number of cyber-attacks affecting the networks of businesses of all sizes, and in all sectors. No one is immune to the threat, and whilst the cost to economies is significant, the cost to individual businesses can be catastrophic. The UK's GCHQ reports that 1,000 cyber-attacks are performed every hour in Britain and 33,000 malicious emails blocked every month containing sophisticated malware. In the U.S., the number of cyber intrusions has increased by seventeen times, according to the chairman of the Joint Chiefs of Staff, General Martyn Dempsey.

The US Department of Homeland Security has revealed that twenty-three attacks have been carried out against companies connected to the US gas pipeline alone. The US Defense Science Board reported that hackers had gained access to over twenty-four major military systems, comprising top-secret information, including the designs of anti-ballistic missiles and fighter jets. 93% of large corporations and three quarters of small businesses in the UK are estimated to have had a cybersecurity breach in the past year. So pernicious has the threat become that, by the end of 2012, over half of European Union and NATO member nations had adopted a national cyber strategy.

The international press reports state-sponsored cyber-attacks represent a growing and significant threat, with countries looking to gain competitive commercial or political advantage through either stealing data, or compromising and disrupting key commercial, industrial and economic assets. Yet the threat to commercial companies is far broader than this. Malicious 'insiders' are difficult to detect through conventional methods, as they use legitimate and authorized access to networks to facilitate the theft of critical data and IP. Data loss through negligent behavior (laptops lost, public devices left logged-on to host networks, etc.) remains a threat. In 2012, a major bank lost the details of over 250,000 customers, including names, addresses, dates of birth and Social Security numbers, when unencrypted back-up tapes were lost in transit. Increasing numbers of attacks are delivered against executives travelling to high-risk countries with little or no awareness of either the threat or behavioral mitigations.

Organizations today are faced with more complex data, in higher and higher volumes, and the commercially viable timescales that determine its use and value are getting shorter. Additionally, faced with a rapidly-changing technology base, business is having to engage with and integrate a wide range of increasingly disruptive technologies, such as mobile and cloud-based computing, BYOD (Bring Your Own Device), and a diverse range of social media tools and technologies, just to remain compatible with peers. These technologies must be integrated and offered to staff and customers in relatively short time-scales. The challenge that they represent requires a fundamental shift in traditional perceptions of information security. Organizations are critically dependent on the flow of data between disparate parts of their organizations, to a mobile workforce, and to customers who demand efficient IT services. As a consequence enterprise boundaries have become electronically porous, dynamic and ill-defined. The conventional IT security model that relies on strict border/gateway control, which is analogous to the historical physical defensive methods of moats and drawbridges to keep attackers out, has by universal consensus broken down. By this convention the IT security industry spends considerable effort trying to police the perimeters of the corporate network, and protect it from unauthorized access. The dominant instantiation of this paradigm has been the regular expression driven SIEM (Security Information and Event Management) and signature driven endpoint products in a proliferation of forms.

These forms including many which restrict users' access to the network according to a defined set of corporate security policies. The reality, however, is that many, if not all, large corporate networks are likely to have already been compromised, and that malicious actors, either external or insider, have actively been targeting data. Today's socially-engineered threats, Advanced Persistent Threats and insider attacks by definition cannot simply be locked out. Data now needs protecting in the wild and can no longer exist behind high walls.

Deterministic approaches to threat detection have therefore been taken. Such traditional deterministic approaches are reliant on the assumption that the difference between what is legitimate activity and what is illegitimate activity can be defined. An expanding set of corporate policy and rules have been written to identify client programs as either compliant or not compliant. However, such deterministic approaches require a vast amount of effort to be spent in constantly updating these rules and signatures, in an attempt to stay up to date with the changing threat environment. The definition of what is legitimate is based on what we know about past attacks. For each successful intrusion, a new rule is written, the signature is updated and the next time that same threat presents itself, access is denied or challenged. This method is effective in defending against known threats that have already been identified. However, it is incapable of responding to fresh threats that are constantly presenting either through minor adjustments to existing vectors or more significant evolution of attack methods. Consequently, current threat detection and prevention systems are still being compromised and are unable to keep out threats.

Furthermore, as the technical defenses that protect our data have become more sophisticated, attackers have increasingly turned their attention to the softest part of the network, the user. Socially-engineered attacks account for over 85% of espionage threat, and were the fastest-growing attack vector of 2012. Attackers use subtle and sophisticated methods to manipulate human users to unwittingly install attacks on their behalf, and traditional technical defenses are rendered impotent within a process where a legitimate user has decided to click on a link in a 'weaponized' email or visited a familiar yet now compromised website. These new forms of attack make the problem of detecting threats even harder.

SUMMARY

Disclosed herein is a more intelligent approach to anomalous behavior and cyber-threat detection, which embraces the nature of mobile data and porous networks. This new approach is realistic and informed about the threat, and seeks to recognize quiet threats in a noisy environment. Several key assumptions have been challenged in order to understand why knowledge of yesterday's attacks will not defend against those of tomorrow.

It has firstly been recognized that relying on identifying threats based on rules associated with previously identified threats is not sufficiently secure. Consequently, a completely new approach has been developed in order to overcome the problems of such traditional techniques.

It has also been accepted that real human beings are at either end of the attack chain, which allows for a more considered approach to detecting the idiosyncratic human factors that enable cyber threats. Shifting the perception of the threat allows solutions to be created that take as a base assumption the presence of the threat. A method and system is therefore provided in this disclosure that can detect subtle shifts and patterns, changes in behavior both of humans and machines, and highlight hitherto undetected threats.

The indicators of compromise are often subtle and complex. To take the insider threat, according to the CERT Insider Threat Center at the Carnegie Mellon University Software Engineering Institute, insiders that are intent on, or considering, malicious attacks often exhibit identifiable characteristics and/or warning signs before engaging in those acts. These signs are often hard to detect as they are often no more than subtle distortions of normal and legitimate behavior. For example the contractor checking into the office building after hours and using the photocopier, a group of files being transferred under a new employee account or a specific email communication being sent out of working hours—such weak pieces of information individually can, seen together, form indicators of mal-intent. These small indicators call for an intelligent approach that is able to see patterns in the information and activity and build an understanding of what is normal at any one time, and what is genuinely anomalous, based on the current threat and network environment. To be operationally viable any such technology must not produce large numbers of false positives currently associated with traditional network intrusion detection systems.

The method and system disclosed herein enable automatic probabilistic real-time detection of cyber threat or compromise to computers and/or networks through changes in the computers and/or networks' behavior. The method and system also permits the automatic detection of human insider staff threat as their potentially malicious behavior is reflected in changes to the pattern of usage in networked office equipment. This is achieved mathematically without any prior knowledge of the threat type so that both established and entirely novel forms of cyber threat vector can be detected without the need for loading pre-determined signature, rules or antiviral updates etc. The result is a novel passive network and host-wide defensive and surveillance capability.

The method and system disclosed herein have a core Bayesian probabilistic model, referred to as the Hyper Cylinder model. The core model permits automatic detection of cyber threats through probabilistic change in behavior of normal computers and computer networks. This is achieved with a programmatic application of an unsupervised mathematical model used for detecting behavioral change. 'Normal' is not a predefined entity but established dynamically within the model as a function of the real-world activity of each node and or network.

The anomalous behavior detection system disclosed herein may take input from probes in the form of a number of metrics. The metrics may be derived from an environment defined selected combination of: the analysis of full TCP/IP network packet data inspection, third party log file ingestion, endpoint file system and OS parameters, network-level meta data level technologies such as NetFlow and IP Flow Information Export (IPFIX), building power and physical security metrics and data flows etc. These inputs may be converted into a normative model of individual devices on the network and the overall topological 'shape' of the devices external and internal communications.

As mentioned above, to be operationally viable any such technology must not produce large numbers of false positives, currently associated with traditional network intrusion detection systems. The method and system disclosed herein further describe the additional step of establishing groups of entities such as devices or users that behave in a similar way.

In general it takes a set amount of data to build a reasonably accurate model. So it is quicker (from a data availability point of view) to build a model for a group of users or devices than for an individual user or device. For example, but not exclusively, a Bayesian formulation allows the use of group models instead of an individual model in determining anomalous behavior. This would be preferred when there is not enough data to build an accurate individual model, reducing the numbers of false positives.

Grouping can, of course, be performed based on prior knowledge of the environment or system being modeled. For example, in a typical business environment, users may be grouped on whether they work in the accounts department, the sales department or the warehouse. Similarly, devices related to each of these sections of the business can also be grouped.

Further disclosed herein is an alternative method, spectral partitioning, for the grouping of entities. The method enables the grouping of entities, such as users, by identifying groups of people working together or closely connected to each other. Generally, this is achieved with an algorithm which uses the network traffic data or metrics described above. As such, the method does not require any prior knowledge of the system being modeled. The method is also useful in visualizing devices in user interfaces. Having such grouping information improves the anomaly detection models and methods.

An anomalous behavior detection system may be a plurality of hardware and software components that work together in order to detect anomalous behavior. The system can comprise a processing system, such as a computer or server, which monitors its own behavior, or, it can comprise a processing system which is otherwise independent of the system being monitored in that its own behavior is not monitored. The system can comprises a plurality of such systems working in unison either with or without a central controller.

A computer system may be understood to be a network of computers that communicate with one or more other computers within the overall system. Alternatively, a computer system may be a single computer, in which case entities of the computer system may be different hardware aspects, software aspects, users or peripheral devices.

In summary, a method for use in detection of abnormal behavior of an entity of a computer system is disclosed, the method arranged to be performed by a processing system, the method comprising: creating a Bayesian model of normal behavior of the entity; and determining, in accordance with the Bayesian model of normal behavior of the entity, a parameter indicative of abnormal behavior of the group of entities.

The entity may comprise a user of the computer system. The entity may comprise a device of the computer system. The model may comprise at least two of: time, a user, a device, an activity and network traffic data.

The Bayesian model may be such that: users, U, are dependent on time, T; devices, D, are dependent on users, U, and time, T; activities, A, are dependent on devices D, users, U, and time, T; and network traffic data, N, is dependent on activities, A, devices, D, users, U and time, T.

The Bayesian model may comprise one of the conditional probability terms: P(U/T); P(D/U,T); P(A/D,U,T); and P(N/A,D,U,T).

The method may further comprise determining, in accordance with the parameter indicative of abnormal behavior of the entity of the computer system, a new parameter indicative of a cyber-threat.

Furthermore, a method for use in detection of abnormal behavior of a group of a plurality of entities of a computer system is disclosed, the method arranged to be performed by a processing system, the method comprising: creating a model of normal behavior of the group of entities; and determining, in accordance with the model of normal behavior of the group of entities, a parameter indicative of abnormal behavior of the group of entities.

The group of entities may be formed by grouping the plurality of entities of the computer system.

The method may comprise grouping the plurality of entities of the computer system to generate the group of entities based on data associated with the plurality of entities of the computer system.

The grouping of the plurality of entities of the computer system to generate the group of entities may be performed by spectral partitioning.

The grouping of the plurality of entities of the computer system to generate the group of entities may be based on prior knowledge of the plurality of entities of the computer system.

The model of normal behavior of the group of entities may be based on metrics representative of data associated with the plurality of entities of the computer system.

The model of normal behavior of the group of entities may be based on a Bayesian model.

The parameter indicative of abnormal behavior of the group of entities may be a probability.

When the model is a Bayesian model, the model may comprise the group and one or more elements including a time characteristic associated with the group and/or one or more entities of the group, a device associated with an entity of the group, an activity associated with an entity of the group and network traffic data associated with an entity of the group.

The Bayesian model may be such that within the model,
groups, G, are dependent on time, T;
devices, Y, are dependent on groups, G, and time, T;
activities, A, are dependent on devices, D, groups, G, and time, T; and
network traffic data N is dependent on activities, A, devices, D, groups, G, and time, T.

The Bayesian model may be such that it comprises one of the conditional probability terms:
P(G/T);
P(Y/G,T);
P(A/Y,G,T); and
P(N/A,Y,G,T).

The conditional probability terms may be updated with an interpolation term with an interpolation weight w.

The conditional probability terms may be updated with an interpolation term with an interpolation weight w, wherein:

$$P(U/T) \rightarrow wP(U/T)+(1-w)P(G/T)$$

$$P(D/U,T) \rightarrow wP(D/U,T)+(1-w)P(Y/G,T)$$

$$P(A/D,U,T) \rightarrow wP(A/D,U,T)+(1-w)P(A/Y,G,T)$$

$$P(N/A,D,U,T) \rightarrow wP(N/A,D,U,T)+(1-w)P(N/A,Y,G,T)$$

The interpolation weight w may be determined based on the amount of data available for modeling a particular user.

The method may further comprise determining, in accordance with the parameter indicative of abnormal behavior of the group of the computer system, a new parameter indicative of a cyber-threat.

The plurality of entities of the computer system may comprise one of a device, a user or an activity.

According to another aspect of the claimed invention, there is provided a computer readable medium comprising computer readable code operable, in use, to instruct a computer to perform any method disclosed herein.

According to another aspect of the claimed invention, there is provided an anomalous behavior detection system comprising a processor, and a memory comprising computer readable code operable, in use, to instruct the processor to perform any method disclosed herein.

BRIEF DESCRIPTION OF THE DRAWINGS

Arrangements shall now be described with reference to the drawings in which.

Throughout the description and the drawings, like reference numerals refer to like parts.

SPECIFIC DESCRIPTION

Figure 1:
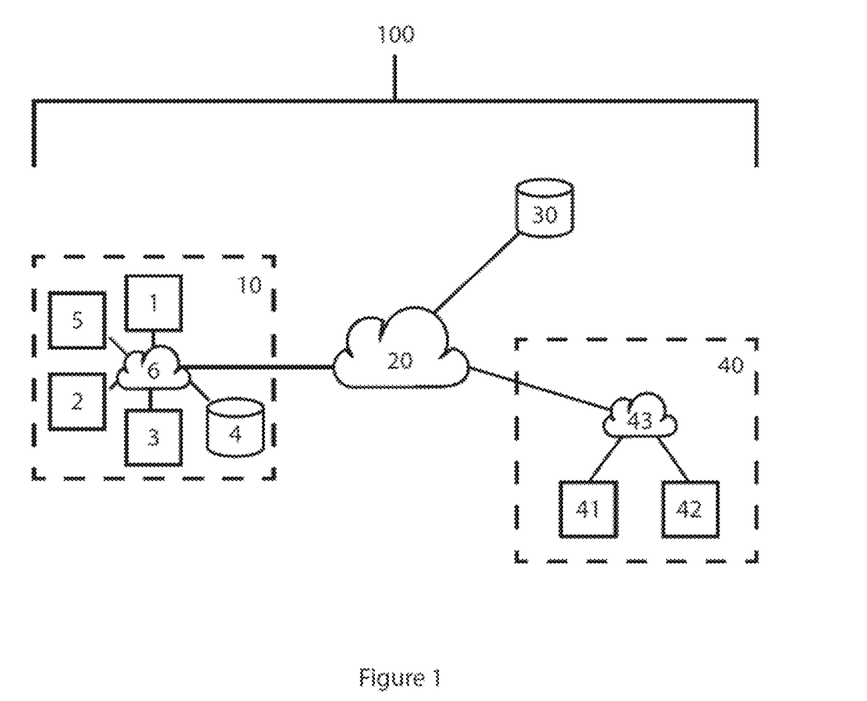
FIG. 1 illustrates a network of computer systems 100 using an anomalous behavior detection system.

FIG. 1 illustrates a network of computer system 100 using an anomalous behavior detection system. The system depicted by FIG. 1 is a simplified illustration which is provided for ease of explanation.

The system 100 comprises a first computer system 10 within a building, which uses the anomalous behavior detection system to detect anomalous behavior and thereby attempt to prevent threats to computing devices within its bounds. The first computer system 10 comprises three computers 1, 2, 3, a local server 4, and a multifunctional device (MFD) 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices including server 30 and second computer system 40. Second computer system 40 also includes two computers 41, 42, connected by a second LAN 43.

In this arrangement, computer 1 on the first computer system 10 has the anomalous behavior detection system and therefore runs the anomalous behavior detection method for detecting anomalous behavior of the first computer system. As such, it comprises a processor arranged to run the steps of the process described herein, memory required to store information related to the running of the process, as well as a network interface for collecting the required information. This method shall now be described in detail with reference to FIG. 1.

The computer 1 builds and maintains a dynamic, ever-changing model of the 'normal behavior' of each user and machine within the system 10. The approach is based on Bayesian mathematics, described in more detail below, and monitors all interactions, events and communications within the system 10—which computer is talking to which, files that have been created, networks that are being accessed.

For example, computer 2 is based in a company's San Francisco office and operated by a marketing employee who regularly accesses the marketing network, usually communicates with machines in the company's U.K. office in second computer system 40 between 9.30 a.m. and midday, and is active from about 8.30 a.m. until 6 p.m. The same employee virtually never accesses the employee time sheets, very rarely connects to the company's Atlanta network and has no dealings in South-East Asia. The anomalous behavior detection system takes all the information that is available relating to this employee and establishes a 'pattern of life' for that person, which is dynamically updated as more information is gathered. The 'normal' model is used as a moving benchmark, allowing the system to spot behavior on a system that seems to fall outside of this normal pattern of life, and flags this behavior as anomalous, requiring further investigation.

The anomalous behavior detection system is built to deal with the fact that today's attackers are getting stealthier and an attacker may be 'hiding' in a system to ensure that they avoid raising suspicion in an end user, such as by slowing their machine down, using normal software protocol. Any attack process thus stops or 'backs off' automatically if the mouse or keyboard is used. However, yet more sophisticated attacks try the opposite, hiding in memory under the guise of a normal process and stealing CPU cycles only when the machine is active, in an attempt to defeat a relatively-simple policing process. These sophisticated attackers look for activity that is not directly associated with the user's input. As an APT (Advanced Persistent Threat) attack typically has very long mission windows of weeks, months or years, such processor cycles can be stolen so infrequently that they do not impact machine performance. But, however cloaked and sophisticated the attack is, there will always be a measurable delta, even if extremely slight, in typical machine behavior, between pre and post compromise. This behavioral delta can be observed and acted on with the novel form of Bayesian mathematical analysis used by the anomalous behavior detection system installed on the computer 1.

The anomalous behavior system has the ability to self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional endpoint defenses, a specific attack type or new malware does not have to have been seen first before it can be detected. A behavioral defense approach mathematically models both machine and human activity behaviorally, at and after the point of compromise, in order to predict and catch today's increasingly sophisticated cyber-attack vectors. It is thus possible to computationally establish what is normal, in order to then detect what is abnormal.

Figure 2:
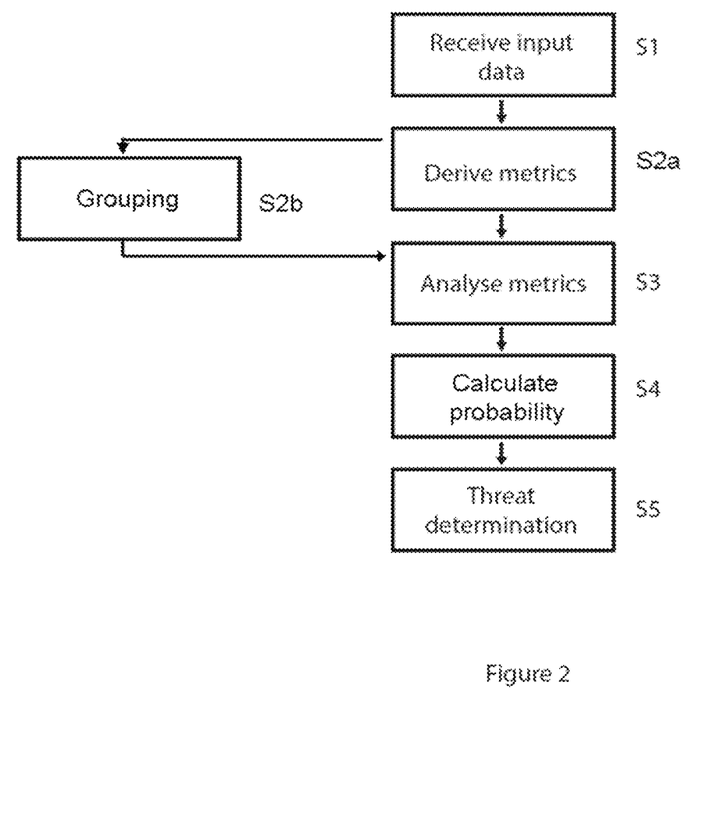
FIG. 2 illustrates a flow diagram of the process carried out by the anomalous behavior detection system of FIG. 1.

The anomalous behavior system shall now be described in further detail with reference to FIG. 2, which provides a flow diagram of the process carried out by the anomalous behavior detection system for automatic detection of anomalous behavior through probabilistic change in normal behavior through the novel application of an unsupervised Bayesian mathematical model to detect behavioral change in computers and computer networks.

The core anomalous behavior detection system is termed the 'Hyper Cylinder'. The Hyper Cylinder is a Bayesian system of automatically determining periodicity in multiple time series data and identifying changes across single and multiple time series data for the purpose of anomalous behavior detection.

Human, machine or other activity is modeled by initially ingesting data from a number of sources at step S1 and deriving second order metrics at step S2$a$ from that raw data. The raw data sources include, but are not limited to:

- Raw network IP traffic captured from an IP or other network TAP or SPAN port
- Machine generated log files.
- Building access ("swipe card") systems.
- IP or non IP data flowing over an Industrial Control System (ICS) distributed network
- Individual machine, peripheral or component power usage.
- Telecommunication signal strength.
- Machine level performance data taken from on-host sources (CPU usage/memory usage/disk usage/disk free space/network usage/etc.)

Being able to relate network data packets to users who are responsible for them is critical in modeling user behavior. Most of the network data packets do not carry user identification—however they do contain enough information to figure out which device they are originating from and/or which device they are destined to reach. Some data packets relating to a few protocols do however contain user credentials as well as device IP addresses. By combining both pieces of information as well as noting that most devices of interest are single user logins it is possible to relate most data packets to individual users. All network devices are identified by the IP address in the data packets. IP addresses assigned to devices however can change from time to time. Mac-addresses of devices on the other hand are fixed and unique for each device.

A table relating a user to an IP address is built, retained and updated throughout the system.

TCP application layer protocols such as KERBEROS, POP3, IMAP and SMTP contain a user credential string in plain text that can be read. It is linked to an IP address from where the traffic originates.

API or system log files can also be interrogated to identify a user with a device. Such an example is VPN log files.

The IP address and a Mac-address can be linked using the results from a ping command or by interrogating DHCP data packets. This way each data packet can be related to a physical device.

There is no way of finding out when a user logs off a device—only when the user logs in. User inactivity patterns can be used to surmise if a user has logged out from a device.

User credentials also appear on data packets destined to mail servers and other types of servers. Such devices can be easily identified and eliminated from modeling the user behavior.

From these raw sources of data, a large number of metrics can be derived each producing time series data for the given metric. The data are bucketed into individual time slices (for example the number observed could be counted per 1 second, per 10 seconds or per 60 seconds), which can be combined at a later stage where required to provide longer range values for any multiple of the chosen internal size. For example if the underlying time slice chosen is 60 seconds long and thus each metric time series stores a single value for the metric every 60 seconds, then any new time series data of a fixed multiple of 60 seconds (120 seconds, 180 seconds, 600 seconds etc) can be computed with no loss of accuracy. Metrics are chosen directly and fed to the Hyper Cylinder by a lower order model which reflects some unique underlying part of the data, and which can be derived from the raw data with particular domain knowledge. The metrics that are obtained depends on the threats that the system is looking for. In order to provide a secure system it is common for a large number of metrics relating to a wide range of potential threats to be obtained.

The actual metrics used are largely irrelevant to the Hyper Cylinder system which is described here, but some examples are provided below.

Metrics derived from network traffic could include data such as:

The number of bytes of data entering or leaving a networked device per time interval.

Probe output such as—File access change point.

Invalided SSL certification.

Failed authorization attempt.

Email access patterns.

In the case where TCP, UDP or other Transport Layer IP protocols are used over the IP network, and in cases where alternative Internet Layer protocols are used (e.g. ICMP, IGMP), knowledge of the structure of the protocol in use and basic packet header analysis can be utilized to generate further metrics, such as:

The number of multicasts per time interval originating from a networked device and intended to reach publicly addressable IP ranges.

The number of internal link-local IP Broadcast requests originating from a networked device.

The size of the packet payload data.

The number of individual TCP connections made by a device, or data transferred by a device, either as a combined total across all destinations or to any definable target network range, (e.g. a single target machine, or a specific network range)

In the case of IP traffic, in the case where the Application Layer protocol can be determined and analyzed, further types of time series metric can be defined, for example:

The number of DNS requests a networked device generates per time interval, again either to any definable target network range or in total.

The number of SMTP, POP or IMAP logins or login failures a machine generates per time interval.

The number of LDAP logins or login failures a generated.

Data transferred via file sharing protocols such as SMB, SMB2, FTP, etc

Logins to Microsoft Windows Active Directory, SSH or Local Logins to Linux or Unix Like systems, or other authenticated systems such as Kerberos.

The raw data required to obtain these metrics may be collected via a passive fiber or copper connection to the networks internal switch gear. Ideally the system receives a copy of each internal packet via a SPANing connection.

For other sources, a number of domain specific time series data are derived, each chosen to reflect a distinct and identifiable facet of the underlying source of the data, which in some way reflects the usage or behavior of that system over time.

Many of these time series data are extremely sparse, and have the vast majority of data points equal to 0. Examples would be employee's using swipe cards to access a building or part of a building, or user's logging into their workstation, authenticated by Microsoft Windows Active Directory Server, which is typically performed a small number of times per day. Other time series data are much more populated, for example the size of data moving to or from an always-on Web Server, the Web Servers CPU utilization, or the power usage of a photocopier.

Regardless of the type of data, it is extremely common for such time series data, whether originally produced as the result of explicit human behavior or an automated computer or other system to exhibit periodicity, and have the tendency for various patterns within the data to recur at approximately regular intervals. Furthermore, it is also common for such data to have many distinct but independent regular time periods apparent within the time series.

At step S2b, the metrics are grouped. Due to the larger number of data points available for a group compared to an individual, grouping can result in a more reliable model, reducing the likelihood of false positives. It also allows a model of 'normal' behavior to be established sooner. For instance grouping may be especially useful when time series data are extremely sparse, and have the vast majority of data points equal to 0.

Conversely, grouping can also be of use when there is not enough memory to hold large individual models such as in a very large organization.

A group may comprise one or more entities of the system being modeled. Entities in a group may be related to one another. They may share a common feature or property. They may be connected to one another. They may be connected in a physical sense (e.g. by sharing a location or being in close physical proximity) or they may be connected in a broader more metaphorical sense (e.g. by performing similar roles within the system or sharing a resource).

The entities themselves (and their dependencies) are defined in the model of the system. In general entities may be users, such as employees of a business; devices, such as computers or photocopiers; and activities, such as sending emails or using a device.

Specific users or devices can be grouped based on prior knowledge of the system being modeled. That is to say, entities within the system will often already have been organized into groups based on their relationships or connections. For instance, continuing the example of FIG. 1 above, computer 2 would be in one group—the San Francisco office—while computers at the U.K. office would be in a different group. The users of these computers might also be in these groups. The individual offices themselves might comprise sub-groups, for example, for the different departments within the office. This information can then be fed into the system model. However, an inconvenience of this type of grouping is that the groups must be continually updated by, for instance, the system administrator as and when the system being modeled evolves or working patterns change.

We now present a superior method of grouping—spectral partitioning using a 'network spectral partitioning' (NSP) algorithm. The network traffic data, aggregated network packet data statistics, or metrics described above provide the input data for the algorithm. Advantageously, the method does not require prior knowledge of the specific relationships between individual entities of the system being modeled. The method enables the grouping of entities, such as users, by identifying groups of people, such as accounts, marketing and development divisions, who work together or are closely connected to each other or behave in similar ways with respect to the rest of the system. Similarly, devices which communicate with one another, perform similar functions, share specific users etc. will also be grouped. Activities can also be grouped, for example, by who or what performs the activity. The emergence of new groups and the dissolution of old groups is automatically detected and updated. Furthermore, the existence of previously unidentified links between entities of the computer system may be discovered.

Here the terminology to be used in the description of the NSP algorithm is set out. The input to the NSP algorithm is a list of device labels $V=(v_1, \ldots, v_N)$, and an incomplete set of device distances $D=\{d_{ij}:(i, j) \in S\}$ between these devices indexed by $S \subset [N] \times [N]$ (where $[N]:=(1, \ldots, N)$). The device distances describe a similarity measure between devices, in the sense that a pair of devices with a low distance $d_{ij}$ are considered to be more similar than a pair of devices with a larger distance.

A distance can be computed for those device pairs $(v_i, v_j)$ for which $(i, j) \notin S$, by considering the distance along the shortest path between $v_i$ and $v_j$ through intermediate nodes. If no such path exists, we consider the distance infinite.

A weighted graph is defined as a triple $G=(V, E, W)$ where:
$V=(v_1, \ldots, v_N$ is a list of labeled distinct nodes,
$E \subset [N] \times [N]$ is an edge set such that $(i, j) \in E$ if $(j, i) \in E$ and $(i, i) \notin E$ for all $i \in [N]$,
$W=\{w_{ij}:(i, j) \in E\}$ is an array of edge weights such that $w_{ij} > 0$ and $w_{ij} = w_{ji}$.
Given a weighted graph G, the notation i~j indicates that $(i, j) \in E$.

The induced subgraph of a weighted graph $G=(V, E, W)$ generated by a subset $V' \subset V$ of nodes is the graph $G[V']=(V', E_{V'}, W_{V'})$ where $E_{V'}=E \cap (V' \times V')$ and $W_{V'}=\{w_{ij}:(i, j) \in E_{V'}\}$.

A similarity graph can be constructed from device data (V, S, D) by applying a decreasing function $f: \mathbb{R}^+ \to \mathbb{R}^+$ to the device distances, so that $G_{sim}(V, S, D):=(V, S, W)$ with $w_{ij}=f(d_{ij})$. Unless otherwise specified $f(x)=1/x$ is used. Having constructed a graph from the device data, a metric $d_G$ is defined on the nodes of the graph via the shortest path length: $d_G(v_i, v_i)=0$ and $d_G(v_i, v_j)=d_{ij}$ if i~j, otherwise $$d_G(v_i, v_j) = \min\left\{d_{ik_1} + \sum_{l=1}^{n-1} d_{k_l k_{l+1}} + d_{k_n j}: i \sim k_1, k_1 \sim k_2, \ldots, k_n \sim j\right\}$$

with $d_G(v_i, v_j)=\infty$ if no path exists between $v_i$, $v_j$ in G.

The adjacency matrix A(G) of a weighted graph $G=(V, E, W)$ is the N×N matrix with entries $$a_{ij} = \begin{cases} w_{ij}, & (i, j) \in E, \\ 0, & (i, j) \notin E. \end{cases}$$

The degree of the node $v_i$ is denoted by $deg(v_j)$ and is equal to the total weight of edges into the node:

$$deg(v_i) = \sum_{j=1}^{N} a_{ij}$$

The Laplacian L(G) is also defined as the matrix L with entries:

$$l_{ij} = \begin{cases} deg(v_i), & i = j, \\ -a_{ij}, & i \neq j. \end{cases}$$

The spectrum of $G=(V, E, W)$ is defined to be the set of eigenvalues of L(G), and the ordered spectrum of G is denoted by $\sigma_G=(\lambda_1, \ldots, \lambda_N)$ where $\lambda_1 \leq \lambda_2 \ldots \lambda_N$. $X(G)=(x_1, \ldots, x_n)$ is an orthonormal sequence of eigenvectors of L(G) (such a sequence exists, since L(G) is symmetric, but may not be unique if L(G) has repeated eigenvalues).

The Laplacian is positive semi-definite, and therefore $\lambda_i \leq 0$ for all $i \in [N]$; in fact, since $$L(G) \begin{pmatrix} 1 \\ \vdots \\ 1 \end{pmatrix} = \begin{pmatrix} 0 \\ \vdots \\ 0 \end{pmatrix}$$

$$\lambda_1 = 0 \text{ and } x_1 = \frac{1}{\sqrt{n}}(1, \ldots, 1).$$

The second-smallest eigenvalue $\lambda_2$ is indicative of the connectivity of the graph G, and is referred to as the algebraic connectivity or Fiedler value of G. The Fiedler value is zero if and only if the graph is not connected. The corresponding eigenvector $x_2$ is called the Fiedler vector and has the property of being the embedding of G into $\mathbb{R}$ that minimizes the objective function $$F(x) = \sum_{(i,j) \in E} w_{ij}(x(i) - x(j))^2$$

subject to the constraints $\Sigma_{i=1}^N x(i)=0$, $\Sigma_{i=1}^N x(i)^2=1$.

The spectral partitioning of G is the partitioning of G into two induced subgraphs $G[V^-]$ and $G[V^+]$, where $V^+:=\{v_i \in V:(x_2)_i \geq 0\}$, $V^-:=\{v_i \in V:(x_2)_i < 0\}$. Unless $x_2$ has an entry that is exactly zero, the two subgraphs are interchangeable, as the transformation $x_2 \mapsto -x_2$ does not affect the orthonormality of $(x_1, \ldots, x_N)$.

In the case where G is not connected, and has k connected components, the elements of the Fiedler vector corresponding to each component will be constant. Therefore, the spectral partitioning will separate the graph into two pieces each containing some non-zero number of the original disconnected components. If k≥3 then the spectral partitioning will not be unique.

On the other hand, if the calculation of the Fiedler value and vector is done exactly, then the spectral partitioning is uniquely defined as long as the graph has at most two connected components. However, there may be nodes in the graph that can be placed in either partition due to numerical inaccuracies in the calculation. These 'boundary nodes' can be found and placed in their own category.

For a graph G, the spectral partitioning $(V^-, V^+)$ is denoted by s(G). This is not technically well-defined due to the $V^- \leftrightarrows V^+$ interchangeability and the non-uniqueness of the partitioning when the number of components of G is greater than 2, but this does not affect the output of the NSP algorithm and so the notation s(G) will be used to refer to any valid spectral partitioning. If boundary nodes are found as described above, then the graph is split into two subgraphs $G[V^-]$, $G[V^+]$ and a set B of boundary nodes, where any nodes in B are removed from the node-sets $V^\pm$. This partitioning is denoted by $s_b(G)=(V^-, V^+, B)$.

The network spectral partitioning algorithm uses repeated spectral partitioning to split a device similarity graph $G=G_{sim}(V, S, D)$ into multiple components. As part of the algorithm, a decision is made at each stage whether to accept the partitioning or not. The result of the algorithm is a full binary tree, with G at the root, and with each child being an induced subgraph of its parent. The leaf nodes represent the final clusters produced by the algorithm.

The NSP algorithm itself runs as follows:

```
1:   procedure NETWORK_SPECTRAL_PARTITIONING(G =
     (V, E, W))
2:       T, B ← SPECTRAL_SPLIT(G)
3:       V ← (V₁, ..., Vₙ) : {G[V₁], ..., G[Vₙ]} leaf nodes in T
4:       for v ∈ B do
5:           
```
$$i_v \leftarrow \operatorname{argmin}_{i \in \{1, \ldots, n\}} \frac{1}{|V_i|} \sum_{u \in V_i} d_{G[V_i \cup \{v\}]}(v, u)$$
```
6:       end for
7:       for v ∈ B do
8:           V_{i_v} ← V_{i_v} ∪ {v}
9:       end for
10:  end procedure
11:  function SPECTRAL_SPLIT(G)
12:      T ← trivial tree with single node G at root
13:      (V⁻, V⁺, B) ← s_b(G)
14:      if VALID_SPLIT(G, V⁻, V⁺) then
15:          U±, B± ← SPECTRAL_SPLIT(G[V±])
16:          Attach G[U⁻], G[U⁺] to T by making their roots children of G
             in T
17:          B ← B ∪ B⁻ ∪ B⁺
18:      end if
19:      return T, B
20:  end function
```

The algorithm starts by constructing a trivial tree with a single root node, G. A spectral partitioning with boundary nodes $(V^-, V^+, B)=s_b(G)$ is then computed, and the following procedure is used to decide whether to accept the split. This procedure requires four configurable parameters minsize, maxsize, maxdist and klmin.

1. If G is not connected (in which case $G[V^-]$, $G[V^+]$ will be disconnected in G), then the split is accepted.
2. Otherwise, if the larger of $|V^-|$ and $|V^+|$ is greater than maxsize then the split is accepted; this means that all the output clusters will have at most maxsize nodes.
3. Otherwise, if the smaller of $|V^-|$ and $|V^+|$ is smaller than minsize then the split is rejected. This means that all the output clusters will have at least minsize nodes, unless they result from a split accepted for one of the above reasons.
4. Otherwise, we calculate the average device distances for each of G, $G[V^-]$ and $G[V^+]$. The average device distances $a=(a_1, \ldots, a_N)$ for a device graph G with N nodes are defined by $$a_i = \frac{1}{N} \sum_{j=1}^{N} \min(d_G(v_i, v_j), \text{max}dist)$$

The maxdist parameter is used to ensure that the average distances are finite. Given the average distances a, $a^-$, $a^+$, for G, $G[V^-]$ and $G[V^+]$ respectively, we take logarithms and compute the mean and variance:

$$\mu = \operatorname{mean}((\log a_i)_{i=1}^N), \sigma^2 = \operatorname{var}((\log a_i)_{i=1}^N),$$

$$\mu_\pm = \operatorname{mean}((\log a_i^\pm)_{i=1}^N), \sigma_\pm^2 = \operatorname{var}((\log a_i^\pm)_{i=1}^N).$$

Finally the quantities are computed $$K_\pm := \log \frac{\sigma^2}{\sigma_\pm^2} + \frac{\sigma_1^2 + (\mu_1 - \mu_2)^2}{2\sigma_2^2} - \frac{1}{2}$$

as a measure of how much the distributions of the average distances of the subgraphs $G[V^\pm]$ diverge from the distribution of the average distances of G (note that $K_\pm$ coincides with the Kullback-Leibler divergence of X from $X^\pm$ where X (resp. $X^\pm$) is a normal distribution fitted to the log-average-distances of G (resp. $G[V^\pm]$)).

If $\max(K_-, K_+) > $ klmin then we accept the split, otherwise we reject it.

If the split has been accepted, the algorithm is recursively applied to the resulting subgraphs until no further splits are allowed. All boundary nodes that have been identified during the procedure are then attached to the subgraph with smallest average distance to the boundary node: in other words, for each boundary node v we find the subgraph G[U] which minimizes the quantity $$\frac{1}{|U|} \sum_{u \in U} d_{G[U \cup \{v\}]}(v, u).$$

Once we have done this for all boundary nodes, we attach the boundary nodes to the relevant subgraphs to get the final clustering.

Additional functions used in the NSP algorithm include the following global parameters:
  minsize>0, maxsize>minsize, klmin>0, maxdist>0

```
1:   function LOG_AVERAGE_DISTANCES(G = (V, E, W))
2:       N ← |V|
```

-continued

```
 3:    S = (S_{ij})_{i,j=1}^N ∈ R^{N×N}; x = (x_1, ..., x_n) ∈ R^N
 4:    for i = 1, ..., N do
 5:       for j = 1, ..., N do
 6:          S_{ij} ← min(maxdist, d_G(V_i, V_j))
 7:       end for
 8:
```

$$x_i \leftarrow \log\left(\frac{1}{N}\sum_{j=1}^N S_{ij}\right)$$

```
 9:    end for
10:    return x
11: end function
12: function KL_NORM(G_1, G_2)
13:    for i ∈ {1, 2} do
14:       x_i ← LOG_AVERAGE_DISTANCES(G_i)
15:       μ_i ← mean(x_i)
16:       σ_i^2 ← var(x_i)
17:    end for
18:
```

$$\text{return } \log\frac{\sigma_2^2}{\sigma_1^2} + \frac{\sigma_1^2 + (\mu_1 - \mu_2)^2}{2\sigma_2^2} - \frac{1}{2}$$

```
19: end function
20: function VALID_SPLIT(G, V^-, V^+)
21:    if G[V^-], G[V^+] disconnected in G then
22:       return True
23:    else if max(|V^-|, |V^+|) > maxsize then
24:       return True
25:    else if min(|V^-|, |V^+|) < minsize then
26:       return False
27:    end if
28:    kl^± ← KL_NORM(G[V^±], G)
29:    if max(kl^-, kl^+) > klmin then
30:       return True
31:    else
32:       return False
33:    end if
34: end function
```

Returning to FIG. 2, at step S3, probes carry out analysis of the second order metrics. Probes are discrete mathematical models that implement a specific mathematical method against different sets of variables with the target network. For example, HMM may look specifically at the size and transmission time of packets between nodes. The probes are provided in a hierarchy which is a loosely arranged pyramid of models. Each probe or model effectively acts as a filter and passes its output to another model higher up the pyramid. At the top of the pyramid is the Hyper Cylinder which is the ultimate threat decision making model. Lower order probes each monitor different global attributes or 'features' of the underlying network and or computers. These attributes consist of value over time for all internal computational features such as packet velocity and morphology, end point file system values, and TCP/IP protocol timing and events. Each probe is specialized to record and make decisions on different environmental factors based on the probes own internal mathematical model such as an HMM.

While the anomalous behavior detection system may be arranged to look for any possible threat, in practice the system may keep watch for one or more specific threats depending on the network in which the anomalous behavior detection system is being used. For example, the anomalous behavior detection system provides a way for known features of the network such as desired compliance and Human Resource policies to be encapsulated in explicitly defined heuristics or probes that can trigger when in concert with set or moving thresholds of probability abnormality coming from the probability determination output. The heuristics are constructed using complex chains of weighted logical expressions manifested as regular expressions with atomic objects that are derived at run time from the output of data measuring/tokenizing probes and local contextual information. These chains of logical expression are then stored in and/or on online libraries and parsed in real-time against output from the measures/tokenizing probes. An example policy could take the form of "alert me if any employee subject to HR disciplinary circumstances (contextual information) is accessing sensitive information (heuristic definition) in a manner that is anomalous when compared to previous behavior (Hyper Cylinder output)". In other words, different arrays of pyramids of probes are provided for detecting particular types of threats.

The analysis performed by the probes on the second order metrics then outputs data in a form suitable for use with the model of normal behavior. As will be seen, the data is in a form suitable for comparing with the model of normal behavior and for updating the model of normal behavior.

As mentioned above, in one arrangement Bayesian mathematical analysis is used to detect anomalous behavior. One example of such a Bayesian analysis model will now be explained in detail.

Figure 3:
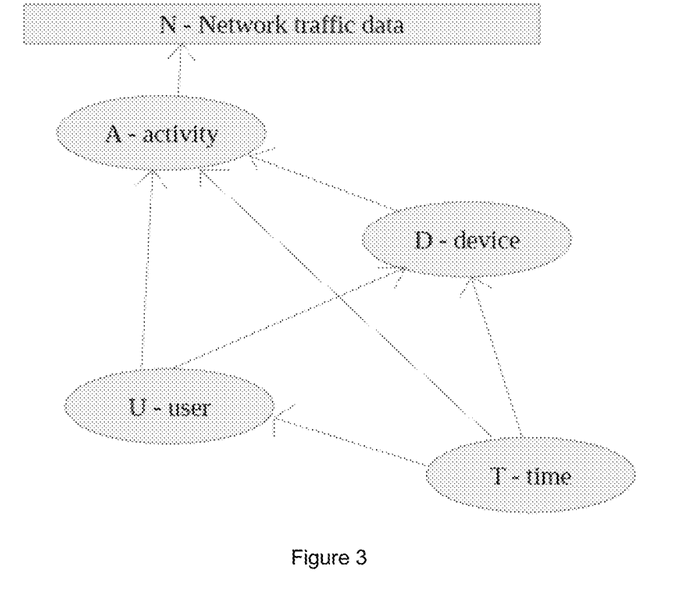
FIG. 3 illustrates an arrangement of dependencies that might exist between the modeled entities within the anomalous behavior detection system of FIG. 1.

FIG. 3 shows an example of the possible conditional dependencies between modeled entities within an anomalous behavior detection system: the user (U), devices (D), activities (A) and the observed network traffic data (N). The entities are a set of random variables. The network traffic data is acquired, for instance, using a packet streamer installed in the computer network. The wall clock time (T) is also used. Time directly influences what the users and devices do and which activities are performed. Users influence what the devices do and which activities are performed. Devices influence which activities are performed. Time, users and devices all influence the network traffic indirectly, while activities directly influence network traffic. These dependencies define the conditional probability terms for the Bayesian model, where a conditional probability is the probability of an event, given that another has already occurred. It should be noted that the dependencies can be modeled in many ways and FIG. 3 is only one example of such a model. For example, it is possible to not include one of the entities, such as the devices. Alternatively, additional entities, such as appliances or groups of entities, can be incorporated. The dependencies between these groups can also be defined differently. For example, activities may depend only on users rather than users and devices.

The identity of a user can be verified most of the time using various network related data. A device is the device that the user is using. A user can be using more than one device at any one time. Activities are the type of activity engaged by the user. Activities can be categorized into one of a number of types such as sending/replying to emails etc.

The resulting conditional probability terms are:

P(U/T): The user has a time pattern for reporting for work or be engaged in work activities.

P(D/U,T): The user has a pattern of choosing the device to work on at a time in the day.

P(A/D,U,T): The user has a pattern of doing a certain type of work on a particular device given the time of the day.

P(N/A, D,U,T): The network traffic data due to a user performing a certain type of work on a particular device given the time of the day.

We will now describe the process of detecting anomalous user activities. Let A be the set of normal activities of a person. Let A' represent the set of abnormal or anomalous activities. The pattern of normal activities is actively learned from user data. The pattern of abnormal activities could be represented by a parametric distribution or a "general" model applicable to a set of abnormal activities. This could also be learnt from historical anomalous data.

The joint probability function that describes the network traffic data is $$P(N,A,U,T,D)=P(N/A,D,U,T) \times P(A/D,U,T) \times P(D/U,T) \times P(U/T)$$

The probability that a specific user is engaged in a specific type of activity $A_0$ at a particular time or time slot is therefore:

$$P(A_0/U,T,N) = \frac{\sum_D P(N/A_0,D,U,T) \times P(A_0/D,U,T) \times P(D/U,T) \times P(U/T)}{\sum_D \sum_{A \in A \cup A'} P(N/A,D,U,T) \times P(A/D,U,T) \times P(D/U,T) \times P(U/T)}$$

The probability that a specific user is engaged in a specific type of activity $A_0$ over a whole day is:

$$P(A_0/U,T,N) = \frac{\sum_D \sum_T P(N/A_0,D,U,T) \times P(A_0/D,U,T) \times P(D/U,T) \times P(U/T)}{\sum_D \sum_T \sum_{A \in A \cup A'} P(N/A,D,U,T) \times P(A/D,U,T) \times P(D/U,T) \times P(U/T)}$$

The probability that a user is engaged in normal activities at any given time is expressed by the formula below:

$$P(\text{normal activity}) = \sum_{A \in A} P(A/U,T,N)$$

Note that the total marginal probability will always sum up to one as below:

$$\sum_{A \in A \cup A'} P(A/U,T,N) = 1$$

A user is deemed to be engaged in anomalous activity if the probability of all normal activities falls significantly short of 1.0.

The conditional distributions used in the above formulae are estimated or updated in an iterative fashion.

One way in which grouped data, for example for grouped users, can be implemented in the Bayesian network system described above is as follows:

G—the group. A group is made up of users clustered together.

Y—the device type that the user is using.

The conditional probability terms involving user groups and device types are as below:

P(G/T): The group has a time pattern for reporting for work or be engaged in work activities.

P(Y/G,T): The group has a pattern of choosing the device type to work on at a time in the day.

P(A/Y,G,T): The group has a pattern of doing a certain type of work on a particular type of device given the time of the day.

P(N/A,Y,G,T): The network traffic data due to a user performing a certain type of work on a particular device given the time of the day.

These conditional probabilities are calculated accumulating over the users within the group.

The four conditional probability terms in the anomaly calculation equations in above are updated with an interpolation term with an interpolation weight was below:

$$P(U/T) \rightarrow wP(U/T)+(1-w)P(G/T)$$

$$P(D/U,T) \rightarrow wP(D/U,T)+(1-w)P(Y/G,T)$$

where Y is the device type of device D and G is the group the user U belongs to.

$$P(A/D,U,T) \rightarrow wP(A/D,U,T)+(1-w)P(A/Y,G,T)$$

$$P(N/A,D,U,T) \rightarrow wP(N/A,D,U,T)+(1-w)P(N/A,Y,G,T)$$

The interpolation formula is used when there is not enough behavioral user data to create a reasonably accurate Bayesian model—such a case is when a new user joins the network. The new user will be assigned to an initial group based on his role in the organization and his activity can be monitored based on the behavior pattern for his group. A more accurate user model can be created over time as his activity pattern builds up. The interpolation formula is a seamless way of starting with the group model for the new user and gradually transitioning to the specific user model over time as data builds up. In some cases it is preferable to user a small non-zero weight for the group behavior model to reduce false positives due to group wise trends.

Combining the group behavior model with the user model can reduce false alerts. Such modeling allows the particular user to engage in other activities from time to time that is common to his group. Interpolating is also useful when modeling new users to an organization.

Returning to FIG. 2, at step S4, the anomalous behavior detection system computes an anomalous behavior parameter indicative of a likelihood of there being anomalous behavior using automated adaptive periodicity detection mapped onto observed behavioral pattern-of-life analysis. This deduces that an anomalous behavior over time exists from a collected set of attributes that themselves have shown deviation from normative collective or individual behavior. The automated adaptive periodicity detection uses the period of time the Hyper Cylinder has computed to be most relevant within the observed network and or machines. Furthermore, the pattern of life analysis identifies how a human and/or machine behaves over time, i.e. when they typically start and stop work. Since these models are continually adapting themselves automatically they are inherently harder to defeat than known systems.

The anomalous behavior parameter is a probability of there being anomalous behavior in certain arrangements. Alternatively, the anomalous behavior parameter is a value representative of there being anomalous behavior which is compared against one or more thresholds indicative of the likelihood of anomalous behavior.

In practice, the step of computing the threat involves comparing current data collected in relation to the user with the model of normal behavior of the user. The current data collected relates to a period in time, this could be in relation to a certain influx of new data or a specified period of time from a number of seconds to a number of days. In some arrangements, the system is arranged to predict the expected behavior of the system. The expected behavior is then compared with actual behavior in order to determine whether there is a threat.

In order to improve the accuracy of the system a check can be carried out in order to compare current behavior of a group with associated groups or a user with associated users, i.e. users within a single office. For example, if there is an unexpectedly low level of activity from a group, this may not be due to unusual activity from the group, but could be due to a factor affecting the office as a whole. Various other factors can be taken into account in order to assess whether or not abnormal behavior is present.

In one arrangement, step S4 further comprises determining, in accordance with the parameter indicative of abnormal behavior, a new parameter indicative of a cyber-threat. That is to say the abnormal behavior is indicative of a cyber-threat.

Certain patterns of abnormal behavior may be indicative of a specific cyber-threat. For instance, a computer is based in a company's San Francisco office and operated by a marketing employee who regularly accesses the marketing network, usually communicates with machines in the company's U.K. office in a second computer system between 9.30 a.m. and midday, and is active from about 8.30 a.m. until 6 p.m. The same employee suddenly begins to accesses the employee time sheets, connect to the company's Atlanta network and communicate with a server in South-East Asia. This behavior is anomalous when compared with the 'pattern of life' for that person. This particular combination of anomalous behaviors may be indicative of an employee leaking sensitive information to a competitor, and could be flagged as a potential cyber-threat, requiring further investigation.

Alternatively, it is discovered that multiple computers, optionally a group of computers, are exhibiting a small but noticeable change in behavior. This may be outside of conventional working hours when the computers are usually idle. This small change in behavior across a large sample size may be indicative of the presence of a virus, and could be flagged as a potential cyber-threat, requiring further investigation.

Finally, at step S5 a determination is made, based on the threat risk parameter, as to whether further action need be taken regarding the anomalous behavior. This determination may be made by a human operator after being presented with a probability of there being anomalous behavior or a threat, or an algorithm may make the determination, e.g. by comparing the determined probability with a threshold.

In one arrangement, given the unique global input of the Hyper Cylinder, a novel form of threat visualization is provided in which the user can view the threat landscape across all internal traffic and do so without needing to know how their internal network is structured or populated and in such a way as a 'universal' representation is presented in a single pane no matter how large the network. A topology of the network under scrutiny is projected automatically as a graph based on device communication relationships via an interactive 3D remote observer perspective interface. The projection is able to scale linearly to any node scale without prior seeding or skeletal definition. The topology of the network may be established by spectral partitioning.

The anomalous behavior detection system that has been discussed above therefore implements a propriety form of recursive Bayesian estimation to maintain a distribution over the probability state variable. This distribution is built from the complex set of low-level host, network and traffic observations or 'features'. These features are recorded iteratively and processed in real time on the platform. A plausible representation of the relational information among entities in dynamic systems in general, such as an enterprise network, a living cell or a social community, or indeed the entire internet, is a stochastic network, which is topologically rewiring and semantically evolving over time. In many high-dimensional structured I/O problems, such as the observation of packet traffic and host activity within an enterprise LAN or WAN, where both input and output can contain tens of thousands, sometimes even millions of interrelated features (data transport, host-web-client dialogue, log change and rule trigger, etc.), learning a sparse and consistent structured predictive function is challenged by a lack of normal distribution. To overcome this, the anomalous behavior detection system consists of a data structure that decides on a rolling continuum rather than a stepwise method in which recurring time cycles such as the working day, shift patterns and other routines are dynamically assigned. Thus providing a non-frequentist architecture for inferring and testing causal links between explanatory variables, observations and feature sets. This permits an efficiently solvable convex optimization problem and yield parsimonious models. In such an arrangement, the anomalous behavior detection processing may be triggered by the input of new data. Alternatively, the anomalous behavior detection processing may be triggered by the absence of expected data. In some arrangements, the processing may be triggered by the presence of a particular actionable event.

In a further arrangement, the system permits behavioral abnormality detection within the interactions and, crucially, state of entities within Industrial Control Systems (ICS) whether on-site (e.g. DCS/PLC) and geographically dispersed in the field (e.g. SCADA). This is achieved by combining the Hyper Cylinder with a bespoke smart thresholding ICS protocol aware programmable probe. This creates individual machine models of all entities (e.g. actuator, thermostat, etc.) and remains effective in a mixed-technology environment where a range of industrial control protocols and transport mechanisms are deployed, some of which may be rare and/or proprietary. The objective of the modeling and monitoring is to identify and allow response to attacks that may enable malicious control by an unapproved actor, loss of operator view, manipulation of operator view, and denial of operator control. The system could therefore be applied to any other control of remote devices from aircraft to military systems, as well as the Internet of Things.

The various methods described above may be implemented by a computer program product. The computer program product may include computer code arranged to instruct a computer or an arrangement of computers to perform the functions of one or more of the various methods described above. The computer program and/or the code for performing such methods may be provided to an apparatus, such as a computer, on a computer readable medium or computer program product. The computer readable medium may be transitory or non-transitory. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

An apparatus such as a computer may be configured in accordance with such code to perform one or more processes in accordance with the various methods discussed herein. Such an apparatus may take the form of a data processing

The invention claimed is:

1. A method for use in detection of abnormal behavior, the method arranged to be performed by a processing system for a cyber security system, the method comprising:
   creating a model of normal behavior of a group of entities from a plurality of entities of a computer system, wherein the model of normal behavior of the group of entities is based on a Bayesian model that uses at least conditional probability terms, wherein within the Bayesian model, groups, G, are dependent on time, T; devices, Y, are dependent on groups, G, and time, T; activities, A, are dependent on devices, D, groups, G, and time, T; and network traffic data N is dependent on activities, A, devices, D, groups, G, and time, T; and
   determining, in accordance with the model of normal behavior of the group of entities, a parameter indicative of abnormal behavior of the group of entities, where the method for the detection of abnormal behavior of the group of entities for the computer system uses at least the determined parameter indicative of abnormal behavior of the group of entities to detect abnormal behavior.

2. The method of claim 1, wherein the group of entities is formed by grouping the plurality of entities of the computer system.

3. The method of claim 2, wherein the grouping of the plurality of entities of the computer system to generate the group of entities is based on data associated with the plurality of entities of the computer system.

4. The method of claim 2, wherein the grouping of the plurality of entities of the computer system to generate the group of entities is performed by spectral partitioning.

5. The method of claim 2, wherein the grouping of the plurality of entities of the computer system to generate the group of entities is based on prior knowledge of the plurality of entities of the computer system.

6. The method of claim 1, wherein the model of normal behavior of the group of entities is based on metrics representative of data associated with the plurality of entities of the computer system.

7. The method of claim 1, wherein the Bayesian model comprises the group of entities and one or more elements including a time characteristic associated with the group of entities and/or one or more entities of the group of entities, a device associated with a first entity of the group, an activity associated with a second entity of the group and network traffic data associated with a third entity of the group of entities.

8. The method of claim 1, wherein the Bayesian model uses at least one or more of the conditional probability terms:
   $P(G/T)$;
   $P(Y/G,T)$;
   $P(A/Y,G,T)$; and
   $P(N/A,Y,G,T)$.

9. The method of claim 8, wherein the conditional probability terms are updated with an interpolation term with an interpolation weight w, wherein:

$$P(U/T) \rightarrow wP(U/T)+(1-w)P(G/T)$$

$$P(D/U,T) \rightarrow wP(D/U,T)+(1-w)P(Y/G,T)$$

$$P(A/D,U,T) \rightarrow wP(A/D,U,T)+(1-w)P(A/Y,G,T)$$

$$P(N/A,D,U,T) \rightarrow wP(N/A,D,U,T)+(1-w)P(N/A,Y,G,T).$$

10. The method of claim 1, wherein the conditional probability terms are updated with an interpolation term with an interpolation weight w.

11. The method of claim 10, wherein the interpolation weight w is determined based on an amount of data available for modeling a particular user.

12. The method of claim 1, wherein the parameter is a probability.

13. The method of claim 1, further comprising determining, in accordance with the parameter indicative of abnormal behavior of the group of the computer system, a new parameter indicative of a cyber-threat.

14. The method of claim 1, wherein the plurality of entities of the computer system comprises one of a device, a user or an activity.

15. A computer readable non-transitory medium comprising computer readable code that when in use, instructs a computer in the computer system to perform the method of claim 1.

16. An anomalous behavior detection system comprising a processor, and a non-transitory memory comprising computer readable code, that when in use, instructs the processing system to perform the method of claim 1.

* * * * *